US008642919B2

(12) United States Patent
Hogan

(10) Patent No.: US 8,642,919 B2
(45) Date of Patent: Feb. 4, 2014

(54) LASER PROCESSING NOZZLE

(75) Inventor: Roger Hogan, Cambridge (CA)

(73) Assignee: ATS Automation Tooling Systems Inc., Cambridge, ON (CA)

( * ) Notice: Subject to any disclaimer, the term of this patent is extended or adjusted under 35 U.S.C. 154(b) by 322 days.

(21) Appl. No.: 12/750,853

(22) Filed: Mar. 31, 2010

(65) Prior Publication Data
US 2010/0252541 A1 Oct. 7, 2010

Related U.S. Application Data

(60) Provisional application No. 61/165,324, filed on Mar. 31, 2009.

(51) Int. Cl.
B23K 26/14 (2006.01)
(52) U.S. Cl.
USPC .................................................... 219/121.67
(58) Field of Classification Search
USPC .................................................... 219/121.67
See application file for complete search history.

(56) References Cited

U.S. PATENT DOCUMENTS

| 3,696,230 | A | 10/1972 | Friedrich |
| 4,027,137 | A | 5/1977 | Liedtke |
| 4,121,085 | A | 10/1978 | Diemer et al. |
| 4,461,947 | A | 7/1984 | Ward |
| 4,467,171 | A | 8/1984 | Ramos |
| 5,239,552 | A | 8/1993 | Okuyama et al. |
| 5,756,962 | A | 5/1998 | James et al. |
| 6,118,097 | A | 9/2000 | Kaga et al. |
| 6,683,277 | B1 | 1/2004 | Millard et al. |
| 6,797,919 | B1 | 9/2004 | Millard et al. |
| 2004/0226927 | A1* | 11/2004 | Morikazu et al. ........ 219/121.84 |
| 2005/0189331 | A1 | 9/2005 | Millard et al. |

OTHER PUBLICATIONS

OPTEC Excimer Laser Micromachining, He Shield Gas in Excimer Laser MicroMachining, Technote RA04, www.optec.be, 2008.

* cited by examiner

Primary Examiner — William D Coleman
(74) Attorney, Agent, or Firm — Borden Ladner Gervais LLP; Neil Henderson

(57) ABSTRACT

A laser ablation nozzle including a main pressure chamber centered on an area of a substrate to be ablated and arranged to push a stream of gas through the main pressure chamber onto the substrate. A vacuum chamber surrounds the main pressure chamber and is arranged to vacuum away the process gas and ablation debris. To attempt to address uneven pressure and flow, flow restrictors can be provided at one or both of the process gas inlet and the vacuum chamber. The vacuum flow restrictor is intended to create constriction in a channel to generate a uniform vacuum induced flow around substantially the entire circumference of the nozzle opening. Similarly, the process gas flow restrictor is intended to generate substantially uniform gas flow into the main pressure chamber.

15 Claims, 6 Drawing Sheets

LASER PROCESSING NOZZLE

CROSS-REFERENCE TO RELATED APPLICATION

This application claims priority from U.S. Provisional Application No. 61/165,324, filed Mar. 31, 2009.

FIELD

The present application relates generally to laser processing, such as laser ablation or laser micromachining. More particularly, the present application relates to a laser processing nozzle such as those used with a laser in laser processing operations, for example mask projection laser ablation.

BACKGROUND

Laser processing typically involves the use of a laser to perform activities such as cutting, heating, burning, ablation, or the like. In this application, the focus is on laser ablation however; similar principles may apply to other types of laser processing.

Laser ablation is a process that can be used to remove material from a surface/substrate in a controlled manner. In general, the intense laser energy removes the material through various physical processes, and usually results in plasma being ejected in a plume from the substrate. The process can be precisely controlled by varying the properties of the laser in relation to the material's optical properties.

Mask projected laser ablation is a machining process whereby the distribution of laser energy impinging on the surface/substrate consists of a projected image formed by passing laser energy through a negative of the desired pattern (mask). Mask projection laser ablation offers the advantage of allowing a relatively large area of a particular substrate to be machined at one time compared to other laser machining methods, which allow very limited areas to be machined.

FIG. 1 illustrates an exemplary mask projection system configuration. A laser 10 is sent through condensing optics 12 and onto a mask 14, as described. The laser energy passing through the mask 14 and a projection lens 16 produces the desired pattern on a product 18.

Coverage of mask projection systems is generally limited by available laser pulse energy. The nature of ejected material produced during the ablation process, especially the size and composition of solids, has a substantial effect on the cleanliness of the process and indirectly on the quality of the ablated substrate. Controlling the chemistry of the ablated material and efficient removal of debris are important elements of the process. Process gases, such as an assist gas and/or a cover gas or similar, are typically added to the ablation area to facilitate the ablation process. A cover gas typically provides a controlled (typically inert) environment for the process. An assist gas facilitates the process typically by chemical reaction with the material being machined. For the purposes of this application, both will be referred to as "process gas", since the nozzle is not restricted to the type or purpose of the gas.

A vacuum debris removal system is typically provided to remove ablated material and to provide a controlled environment around the ablated area of the part. However, existing nozzles continue to have problems with regard to debris build-up affecting the laser energy. It is, therefore, desirable to provide an improved laser ablation system.

Although not previously identified, the construction of existing nozzles can cause uneven pressure in the flow of the process gas to the product and in the flow of debris away from the ablation site, potentially having an effect on the quality of debris removal, and on the product itself.

SUMMARY

In a first aspect, a laser ablation nozzle is provided wherein the nozzle includes a main pressure chamber centered on an area of the substrate to be ablated and arranged to push a stream of gas through the main pressure chamber onto the substrate. A vacuum chamber surrounds the main pressure chamber and is arranged to vacuum away the process gas and ablation debris.

In order to attempt to address uneven pressure and flow, flow restrictors can be provided at one or both of the process gas inlet and the vacuum chamber.

The vacuum flow restrictor is intended to create constriction in a channel to generate a uniform vacuum induced flow around substantially the entire circumference of the nozzle opening. Similarly, the process gas flow restrictor is intended to generate substantially uniform gas flow into the main pressure chamber.

In another aspect, the nozzle is provided with process gas flow both at an inlet and an outlet of the main pressure chamber and a vacuum is applied between the inlet and outlet of the main pressure chamber. In this case, flow restrictors are preferably provided to the process gas flows and the vacuum flow.

In one aspect, a laser processing nozzle is provided comprising: a pressure supply chamber to supply a process gas to a pressure chamber through which a stream of the process gas passes onto a substrate; a vacuum source chamber to provide vacuum suction to a vacuum chamber surrounding the pressure chamber and arranged to vacuum the process gas and ablation debris from the substrate; and at least one flow restrictor, the at least one flow restrictor comprising a constricted passageway and the constricted passageway being provided in: a process gas flow passage through which the supply of process gas flows to the pressure chamber; a vacuum flow passage leading from the vacuum chamber to the vacuum source chamber; or both.

In one case, the vacuum chamber is an annular chamber surrounding the pressure chamber and the at least one flow restrictor is an annular vacuum flow restrictor leading to the vacuum source chamber to generate a substantially uniform vacuum induced flow substantially around a circumference of the pressure chamber.

In another case, the at least one flow restrictor is an annular process gas flow restrictor leading to the pressure chamber which generates a substantially uniform process gas flow into the pressure chamber.

In another case, the vacuum chamber is an annular chamber surrounding the pressure chamber and a second one of the at least one flow restrictors is an annular vacuum flow restrictor leading to the vacuum source chamber to generate a substantially uniform vacuum induced flow substantially around a circumference of the pressure chamber.

In another case, the pressure chamber comprises a chamber body having an upper end and a lower end, and the process gas flows into the chamber body from both the upper end and the lower end, and the vacuum chamber is provided between the upper end and the lower end of the pressure chamber.

In another case, one flow restrictor is a vacuum flow restrictor comprising a constricted passageway which generates a substantially uniform vacuum induced flow.

In another case, the at least one flow restrictor is an annular process gas flow restrictor leading to the pressure chamber which generates a substantially uniform process gas flow into the pressure chamber.

In another case, one flow restrictor is a vacuum flow restrictor comprising a constricted passageway which generates a substantially uniform vacuum induced flow.

In yet another case, the process gas is an inert gas.

In another aspect, a laser processing nozzle is provided comprising: a pressure chamber having a chamber body with a top end and a bottom end, a stream of process gas flows into the pressure chamber from both the top end and the bottom end; a vacuum chamber surrounding the pressure chamber at a mid-section of the chamber body, the vacuum chamber providing a vacuum flow of the process gas and ablation debris; and at least one flow restrictor, the at least one flow restrictor comprising a constricted passageway and the constricted passageway being provided in: a process gas flow passage through which the supply of process gas flows to the pressure chamber; a vacuum flow passage leading from the vacuum chamber; or both.

In one case, one flow restrictor is a vacuum flow restrictor comprising a constricted passageway which generates a substantially uniform vacuum induced flow.

In one case, the at least one flow restrictor is a process gas flow restrictor comprising a constricted passageway which generates a substantially uniform process gas flow into the pressure chamber.

In one case, a second one of the flow restrictors is a vacuum flow restrictor comprising a constricted passageway which generates a substantially uniform vacuum induced flow.

In one case, a vacuum source chamber is provided to generate the vacuum flow, the vacuum source chamber being in communication with the vacuum chamber.

In yet another case, the process gas is an inert gas.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures, wherein.

DETAILED DESCRIPTION OF THE PREFERRED EMBODIMENTS

Generally, a laser processing nozzle, which includes a laser ablation nozzle is provided for use with a mask projection laser ablation system for ablation of a substrate. The nozzle includes a main pressure chamber centered on an area of the substrate to be ablated and arranged to push a coaxial stream of gas through the main pressure chamber onto the substrate with a flow of process gas. A vacuum chamber encases the main pressure chamber and is arranged to vacuum away the process gas and ablation debris. A vacuum flow restrictor is provided to create constriction in a channel to force a uniform vacuum induced flow around substantially the entire circumference of the nozzle opening. A process gas flow restrictor can also be provided to constrict process gas flow and generate substantially uniform gas flow into the main pressure chamber.

Figure 1:
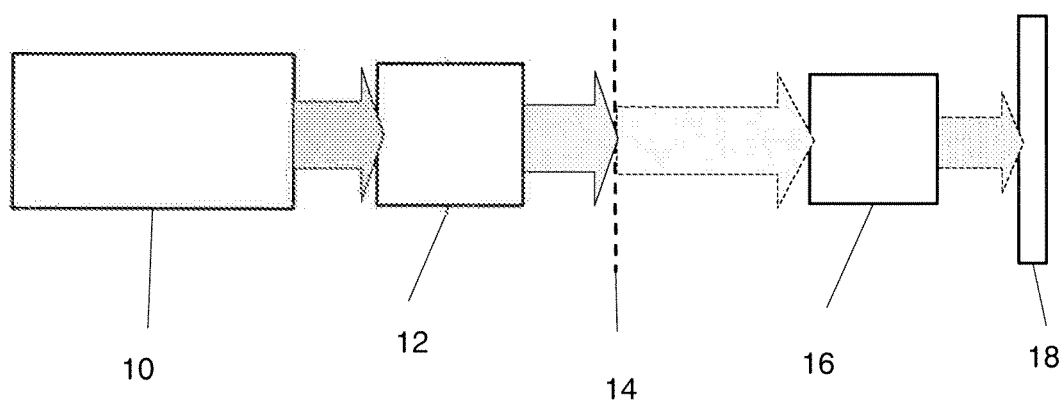
FIG. 1 is a block diagram illustrating an exemplary mask projection system configuration.
Figure 2A:
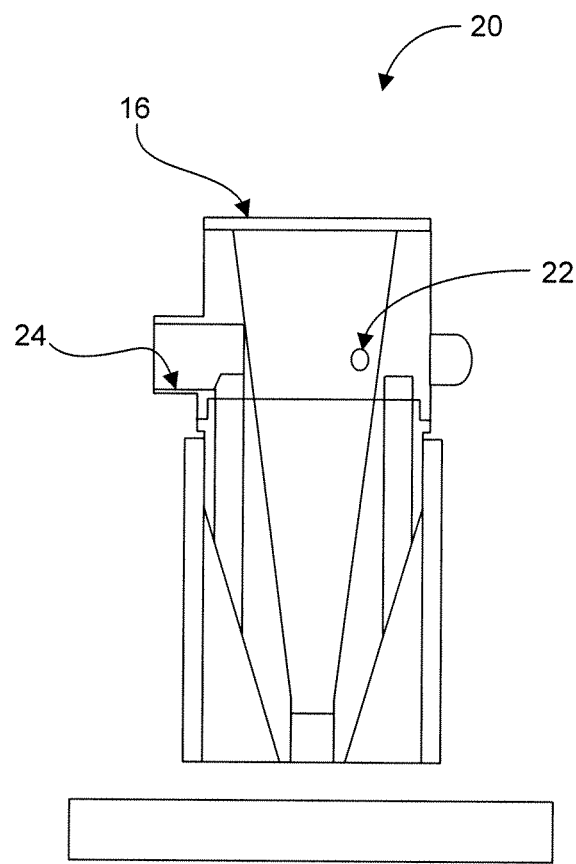
FIGS. 2A and 2B illustrate an exemplary known laser ablation nozzle.
Figure 2B:
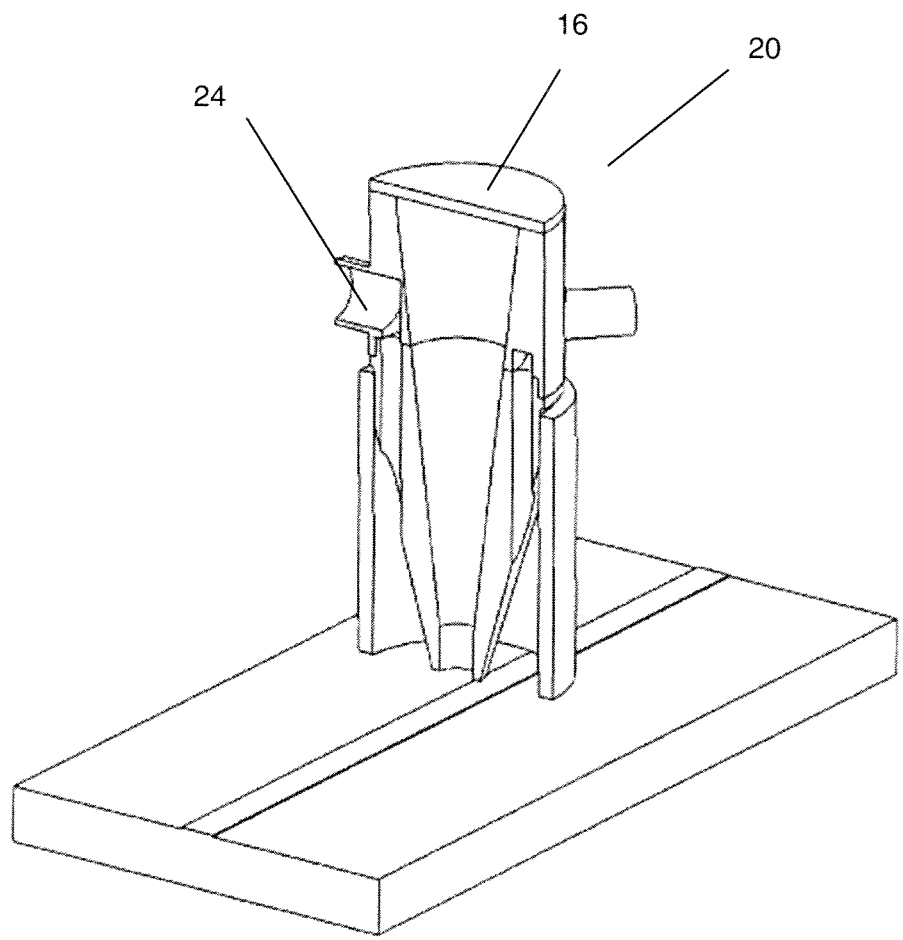

FIGS. 2A and 2B illustrate a typical laser ablation nozzle 20. The nozzle 20 includes a lens 16, an entry port 22 for supplying process gas to a main chamber and a vacuum port 24 for the removal of debris and process gas from a vacuum chamber around the main chamber. In other embodiments, an other entry port may provide a process gas for processing of polymers and/or chemical reaction to produce ablation products.

When using a known nozzle, such as the nozzle 20 of FIGS. 2A and 2B, the removal or sucking away of impurities may not be performed evenly or uniformly due to the shape of the process gas and vacuum ports. Eddy currents and recirculation can be present. Vacuum introduced at the vacuum port on the nozzle creates a vacuum, which sucks the process gas and waste into a vacuum system. Typically, the vacuum chamber opening in such a nozzle has had fairly large openings.

Figure 3A:
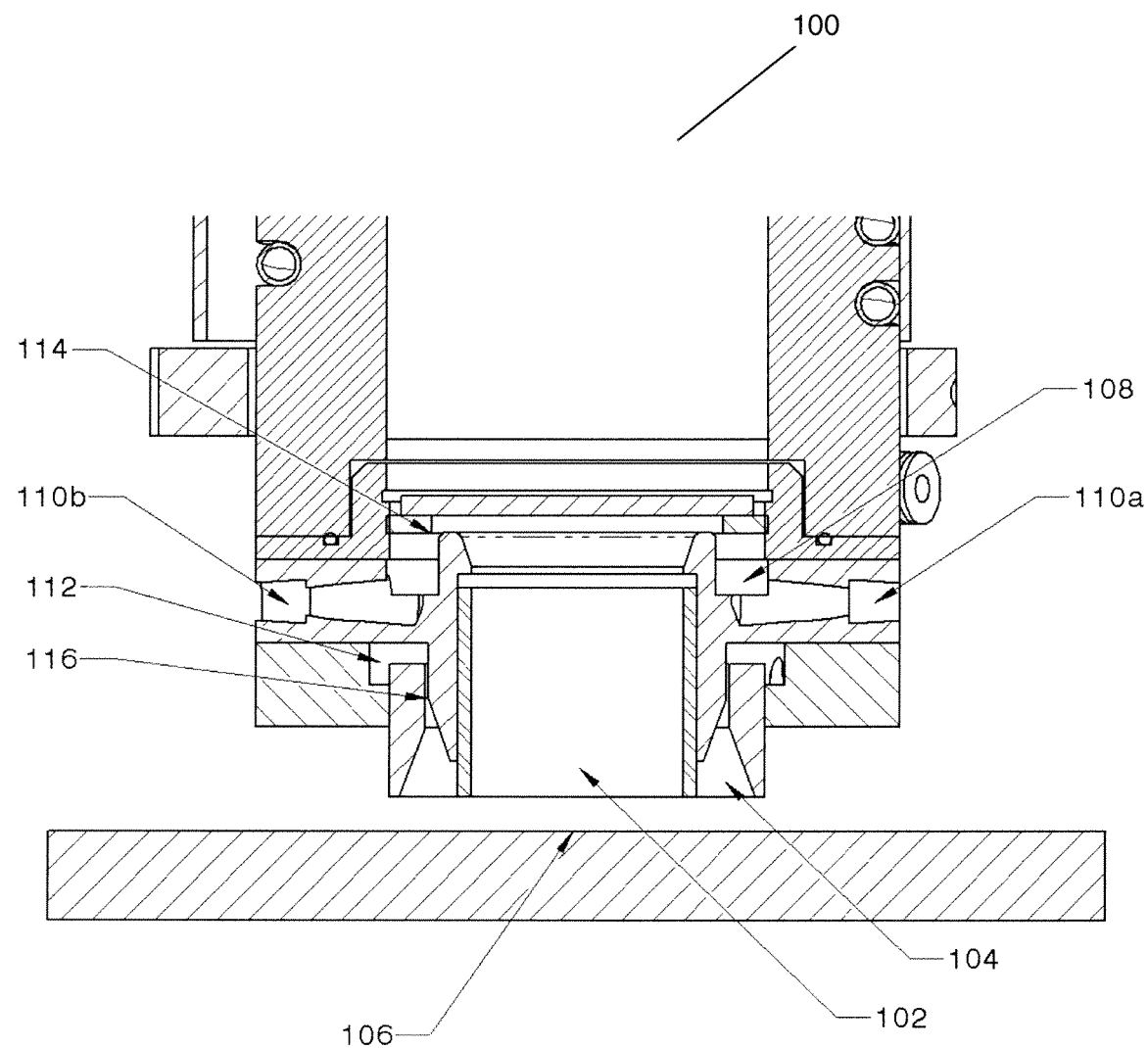
FIGS. 3A and 3B illustrate a laser ablation nozzle according to an embodiment described herein.
Figure 3B:
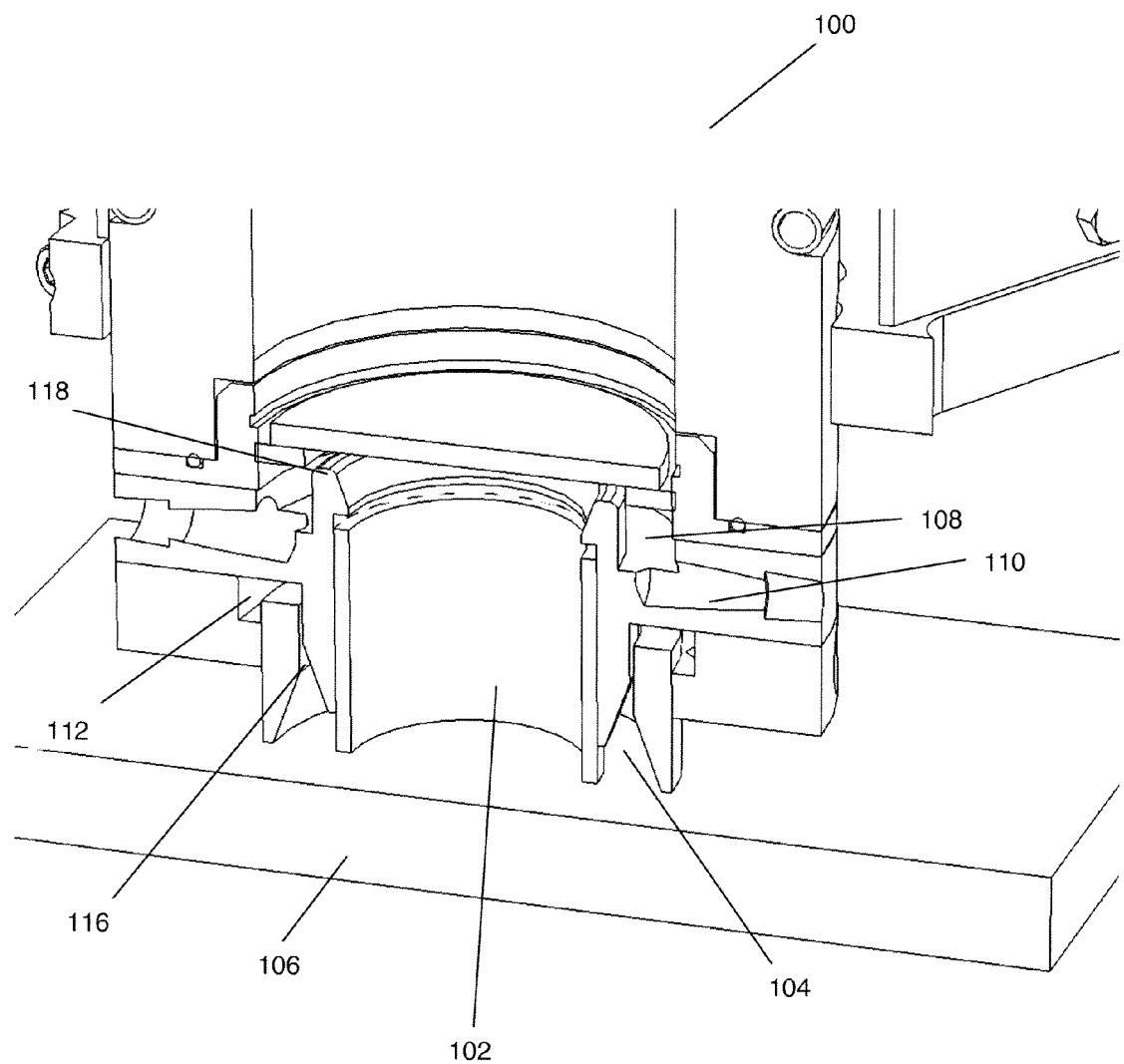

FIGS. 3A and 3B illustrate a cross-section of a laser ablation nozzle 100 according to an embodiment herein. While certain elements of the nozzle are not shown in this figure, these elements of the nozzle, such as optics or the like will be understood by one of skill in the art. As described previously, the laser burns away (ablates) the undesired material and the debris is then removed using a vacuum. Using air in the nozzle may cause problems, so a process gas, such as an inert gas (e.g. helium), is typically used. The process gas and any impurities are sucked away to complete the laser ablation process.

In general, known systems may have a larger open area but the vacuum is applied at one or a few discrete points. The resulting pressure and flow are generally not applied evenly. For example, there is greater suction near the outlet, and reduced suction at the opposite side.

The solution proposed by embodiments described herein is to create annular restrictions in the flow path to create uniform flow. A typical vacuum with a larger opening does not provide constant suction around the whole nozzle opening. Embodiments herein are intended to provide substantially constant, or substantially uniform, flow through and suction around the whole nozzle. This structure provides an advantage of more uniform and consistent removal of debris from the product.

In the embodiment shown in FIGS. 3A and 3B, the nozzle comprises a main pressure chamber 102 and an annular vacuum chamber 104 that, in operation, are positioned above the area of the substrate 106 to be ablated. A pressure supply chamber 108 is provided adjacent the main pressure chamber and a stream of gas is pushed through to the main pressure chamber, which bathes the surface of the part with a flow of process gas. The process gas is supplied to the pressure supply chamber at inlet 110a or 110b.

In this embodiment, the vacuum chamber 104 surrounds the main pressure chamber 102 and captures and vacuums away from the ablation area the process gas and ablation debris. A vacuum is created in a vacuum source chamber 112, typically by a vacuum port or outlet (not shown), wherein the vacuum source chamber 112 is in communication with the vacuum chamber 104. To allow for the most effective removal of debris form the ablation area it is desired that the process gas flow across the part surface be uniform, laminar and symmetric about the center of the ablation area.

According to an embodiment, to accomplish the desired flow profile at the substrate, the process gas (pressure supply) and vacuum chambers are equipped with flow restrictors.

The flow restrictors effectively divide the process gas supply and vacuum areas into two sub areas such that a first area can accept non-uniform positive (process gas) or negative (vacuum) pressure flow from a discrete/point source such as a hose and evenly distribute the pressure and flow substantially symmetrically and substantially uniformly into a second area at the nozzle. The second areas act to allow the spread out, transport and collection of this uniform flow to and from the ablation area.

In this embodiment, the flow restrictors include a vacuum flow restrictor 116, and can optionally include a process gas flow restrictor 114. While the vacuum flow restrictor 116 and process gas flow restrictor 114 are shown in FIGS. 3A and 3B as being portions of an integral part, they can optionally be provided separately.

The annular vacuum flow restrictor 116 is provided between the vacuum source chamber 112 and the vacuum chamber 104. Uneven vacuum pressure in the vacuum source chamber 112 may be distributed and evened out by the vacuum flow restrictor 116 resulting in substantially symmetric and substantially uniform pressure and flow in the vacuum chamber 104 surrounding the main pressure chamber 102. The vacuum flow restrictor 116 shown in the embodiment in FIGS. 3A and 3B has a tapered profile. The vacuum flow restrictor 116 can be shaped and constructed in any other suitable profile to provide the desired substantially uniform flow around the nozzle opening.

Similarly, the annular process gas flow restrictor 114 is provided between the pressure supply chamber 108 and the pressure chamber 102. Uneven pressure in the pressure supply chamber 108 may be distributed and evened out by the pressure flow restrictor 114 resulting in substantially symmetric and substantially uniform pressure and flow in the main pressure chamber 102. The process gas flow restrictor 114 shown in the embodiment of FIGS. 3A and 3B has a partially frusto-conical shape. Similar to the vacuum flow restrictor, the process gas flow restrictor 118 can be shaped and constructed in any other suitable profile to provide the desired substantially uniform gas flow into the main pressure chamber.

Figure 4:
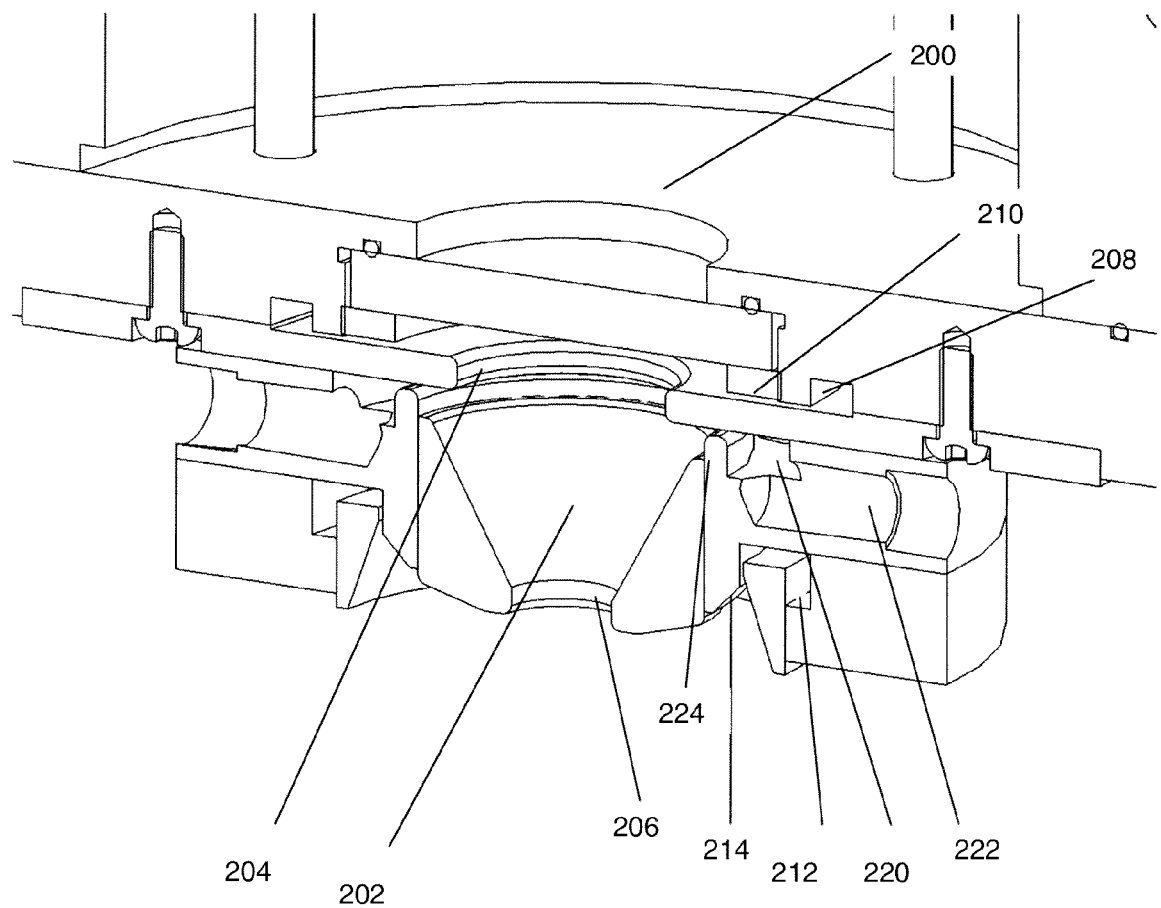
FIG. 4 illustrates another embodiment of the nozzle allowing the introduction of a second gas stream and generation of an upward process gas flow above the substrate.

FIG. 4 shows another embodiment of the nozzle 200. The nozzle 200 has a main pressure chamber 202 with a top end 204 and a bottom end 206.

A top pressure supply chamber 208 is provided to supply process gas to the top end 204. A top process gas flow restrictor 210 is provided between the top pressure supply chamber 208 and the top end 204. The top process gas flow restrictor 210 provides a constricted passageway through which the process gas flows into the main pressure chamber 202 at the top end 204. This results in substantially symmetric and substantially uniform pressure and flow into the main pressure chamber 202 at the top end 204.

Similarly, a bottom pressure supply chamber 212 is provided to supply process gas to the bottom end 206. A bottom process gas flow restrictor 214 is provided between the bottom pressure supply chamber 212 and the bottom end 206. The bottom process gas flow restrictor 210 provides a constricted passageway through which the process gas flows into the main pressure chamber 202 at the bottom end 206. This results in substantially symmetric and substantially uniform pressure and flow into the main pressure chamber 202 at the bottom end 206.

A vacuum chamber 220 is provided at an annular circumference of the main pressure chamber 202. As shown in FIG. 4, the vacuum chamber 220 is positioned below the top pressure supply chamber 208 and above the bottom pressure supply chamber 212. A vacuum source chamber 222 is provided in fluid communication with the vacuum chamber and provides a source of vacuum suction. A vacuum flow restrictor 224 is provided between the vacuum chamber 220 and the main pressure chamber 202. The vacuum flow restrictor 224 provides a constricted passageway through which the vacuum flow sucks process gas and ablation debris. Similar to the top process gas flow restrictor 210 and the bottom process gas flow restrictor 214, the vacuum flow restrictor 224 provides a constricted passageway. The vacuum flow restrictor 214 creates substantially symmetric and substantially uniform pressure and flow from the main pressure chamber 202 to the vacuum chamber 220.

In this embodiment 200, the process gas flows into the main pressure chamber 202 upwards from the bottom end 206. Thus, when the bottom end 206 is positioned proximate to a substrate, an upward flow is created at a surface of the substrate to remove ablation material. The process gas entering at the top end 204 flows down and to the vacuum flow restrictor 224. This provides a flow of process gas that serves to protect optics above the entry point of the process gas.

In the preceding description, for purposes of explanation, numerous details are set forth in order to provide a thorough understanding of the embodiments described herein. However, it will be apparent to one skilled in the art that these specific details are not required.

The above-described embodiments are intended to be examples only. Those of skill in the art can effect alterations, modifications and variations without departing from the scope, which is defined solely by the claims appended hereto.

Although this disclosure has described and illustrated certain embodiments, it is also to be understood that the system, apparatus and method described is not restricted to these particular embodiments. Rather, it is understood that all embodiments which are functional or mechanical equivalents of the specific embodiments and features that have been described and illustrated herein are included.

It will be understood that, although various features have been described with respect to one or another of the embodiments, the various features and embodiments may be combined or used in conjunction with other features and embodiments as described and illustrated herein.

What is claimed is:

1. A laser processing nozzle comprising:
   a pressure supply chamber to supply a process gas to a pressure chamber through which a stream of the process gas passes onto a substrate;
   a vacuum source chamber to provide vacuum suction to a vacuum chamber surrounding the pressure chamber and arranged to vacuum the process gas and ablation debris from the substrate; and
   at least one flow restrictor, the at least one flow restrictor comprising a constricted passageway and the constricted passageway being provided in: a process gas flow passage between a port and the pressure chamber through which the supply of process gas flows to the pressure chamber; a vacuum flow passage between a port leading from the vacuum chamber and the vacuum chamber, or both, such that either or both of the process gas flow passage or the vacuum flow passage are divided into two sub-areas at the nozzle.

2. The laser processing nozzle of claim 1, wherein the vacuum chamber is an annular chamber surrounding the pressure chamber and the at least one flow restrictor is an annular vacuum flow restrictor leading to the vacuum source chamber to generate a substantially uniform vacuum induced flow substantially around a circumference of the pressure chamber.

3. The laser processing nozzle of claim 1, wherein the at least one flow restrictor is an annular process gas flow restrictor leading to the pressure chamber which generates a substantially uniform process gas flow into the pressure chamber.

4. The laser processing nozzle of claim 1, wherein the pressure chamber comprises a chamber body having an upper end and a lower end, and the process gas flows into the chamber body from both the upper end and the lower end, and the vacuum chamber is provided between the upper end and the lower end of the pressure chamber.

5. The laser processing nozzle of claim 1, wherein the process gas is an inert gas.

6. The laser processing nozzle of claim 3, wherein the vacuum chamber is an annular chamber surrounding the pressure chamber and a second one of the at least one flow restrictors is an annular vacuum flow restrictor leading to the vacuum source chamber to generate a substantially uniform vacuum induced flow substantially around a circumference of the pressure chamber.

7. The laser process nozzle of claim 4, wherein one flow restrictor is a vacuum flow restrictor comprising a constricted passageway which generates a substantially uniform vacuum induced flow.

8. The laser process nozzle of claim 4, wherein the at least one flow restrictor is an annular process gas flow restrictor leading to the pressure chamber which generates a substantially uniform process gas flow into the pressure chamber.

9. The laser process nozzle of claim 8, wherein one flow restrictor is a vacuum flow restrictor comprising a constricted passageway which generates a substantially uniform vacuum induced flow.

10. A laser processing nozzle comprising:
a pressure chamber having a chamber body with a top end and a bottom end, a stream of process gas flows into the pressure chamber from both the top end and the bottom end;
a vacuum chamber surrounding the pressure chamber at a mid-section of the chamber body, the vacuum chamber providing a vacuum flow of the process gas and ablation debris; and
at least one flow restrictor, the at least one flow restrictor comprising a constricted passageway and the constricted passageway being provided in: a process gas flow passage between a port and the pressure chamber through which the supply of process gas flows to the pressure chamber; a vacuum flow passage between a port leading from the vacuum chamber and the vacuum chamber, or both, such that either or both of the process gas flow passage or the vacuum flow passage are divided into two sub-areas at the nozzle.

11. The laser processing nozzle of claim 10, wherein one flow restrictor is a vacuum flow restrictor comprising a constricted passageway which generates a substantially uniform vacuum induced flow.

12. The laser processing nozzle of claim 10, wherein the at least one flow restrictor is a process gas flow restrictor comprising a constricted passageway which generates a substantially uniform process gas flow into the pressure chamber.

13. The laser processing nozzle of claim 10, wherein a vacuum source chamber is provided to generate the vacuum flow, the vacuum source chamber being in communication with the vacuum chamber.

14. The laser processing nozzle of claim 10, wherein the process gas is an inert gas.

15. The laser processing nozzle of claim 12, wherein a second one of the flow restrictors is a vacuum flow restrictor comprising a constricted passageway which generates a substantially uniform vacuum induced flow.

* * * * *